United States Patent
Hu et al.

(10) Patent No.: US 8,620,309 B2
(45) Date of Patent: Dec. 31, 2013

(54) POLICY ENABLED ROAMING GATEWAY IN A COMMUNICATION NETWORK

(75) Inventors: Qingmin J. Hu, Sammamish, WA (US); Farooq Bari, Bothell, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 493 days.

(21) Appl. No.: 12/849,422

(22) Filed: Aug. 3, 2010

(65) Prior Publication Data
US 2012/0034916 A1 Feb. 9, 2012

(51) Int. Cl.
*H04W 4/00* (2009.01)

(52) U.S. Cl.
USPC ............. 455/432.1; 455/410; 455/414.1; 455/343.2; 455/452.2

(58) Field of Classification Search
USPC ............. 455/410, 414.1, 343.2, 452.2
See application file for complete search history.

(56) References Cited

U.S. PATENT DOCUMENTS

| | | | | |
|---|---|---|---|---|
| 2007/0277230 | A1* | 11/2007 | Hawkins et al. | 726/4 |
| 2009/0113514 | A1* | 4/2009 | Hu | 726/1 |
| 2012/0185578 | A1* | 7/2012 | Perkuhn et al. | 709/223 |
| 2012/0210003 | A1* | 8/2012 | Castro et al. | 709/225 |

FOREIGN PATENT DOCUMENTS

EP 2003917 A2 * 12/2008 ............ H04M 15/00

* cited by examiner

*Primary Examiner* — Liton Miah
(74) *Attorney, Agent, or Firm* — Turocy & Watson, LLP

(57) ABSTRACT

Systems, methods, and apparatus for centrally managing service related information within a roaming environment are presented herein. A decision component can be configured to decide, based on information associated with a service level agreement, whether to accept, reject, or dynamically negotiate a communication service requested via a mobile device roaming within a visited network. Furthermore, an analysis component can be configured to map one or more parameters related to a quality of the communication service to one or more service policies as a function of the information. Moreover, a distribution component can be configured to distribute the one or more service policies to one or more policy servers of the network; or forward information of the one or more service policies to another network.

16 Claims, 10 Drawing Sheets

POLICY ENABLED ROAMING GATEWAY IN A COMMUNICATION NETWORK

TECHNICAL FIELD

This disclosure relates generally to a policy enabled roaming gateway in communication networks including, but not limited to, a policy enabled roaming gateway in a wireless or a fixed/mobile-converged communication network.

BACKGROUND

Worldwide demand for internet access via mobile devices has facilitated development of various mobile broadband standards, e.g., Third Generation Partnership Project (3GPP) Long Term Evolution (LTE™), LTE™ Advanced (LTE-A), etc. Such standards support high data rate, low latency, Internet Protocol (IP) packet delivery, e.g., related to Voice over Internet Protocol (VoIP), IP multimedia services, etc.

When a mobile device is serviced in an area, or network, associated with a user's own service provider, or operator, the mobile device is serviced within a "home network." On the other hand, when the mobile device is serviced in an area associated with another service provider, the mobile device is serviced in a "visited network." In order to enable use of the mobile device in the visited network, the operator of the home network establishes a roaming agreement, or service level agreement (SLA), with the operator of the visited network. The SLA specifies the cost(s) and quality of service (QoS) requirements, e.g., available bandwidth, data packet loss, bit error rate, etc. of services provided via the visited network.

Although conventional mobile broadband techniques enable policy servers distributed within the home network and the visited network to retain, map, and manage roaming QoS and other service related requirements in the form of policies between networks of roaming partners, such techniques do not consolidate mapping of the QoS requirements between the networks in a centralized manner. Lack of consolidation of roaming related information in a centralized manner creates operational problems of managing a distributed database, e.g., keeping multiple, geographically distributed copies of information synchronized with the most recent roaming agreement(s).

The above-described deficiencies of today's communication networks and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above identified deficiencies of today's communication environments and other drawbacks of conventional wireless roaming environments and/or fixed/mobile converged roaming environments, various systems, methods, and apparatus described herein centrally manage service related information within a roaming environment. For example, aspects of the innovation include systems, methods, and apparatus that can enable a policy enabled roaming gateway (PERG) to map QoS requirement(s) of a communication service requested by an inbound roamer or an outbound roamer of a delivery network to one or more uniform network service policies representing QoS capabilities of the delivery network and information associated with a roaming agreement/service level agreement (SLA).

Further, such aspects can enable the PERG to (1) distribute the one or more uniform network policies to policy servers of a user's home network, e.g., for providing the communication service to the inbound roamer; or (2) transfer, forward, etc. information of the one or more uniform network policies from the user's home network to another network (not shown) associated with the roaming partner(s), e.g., for providing the communication service to the outbound roamer.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
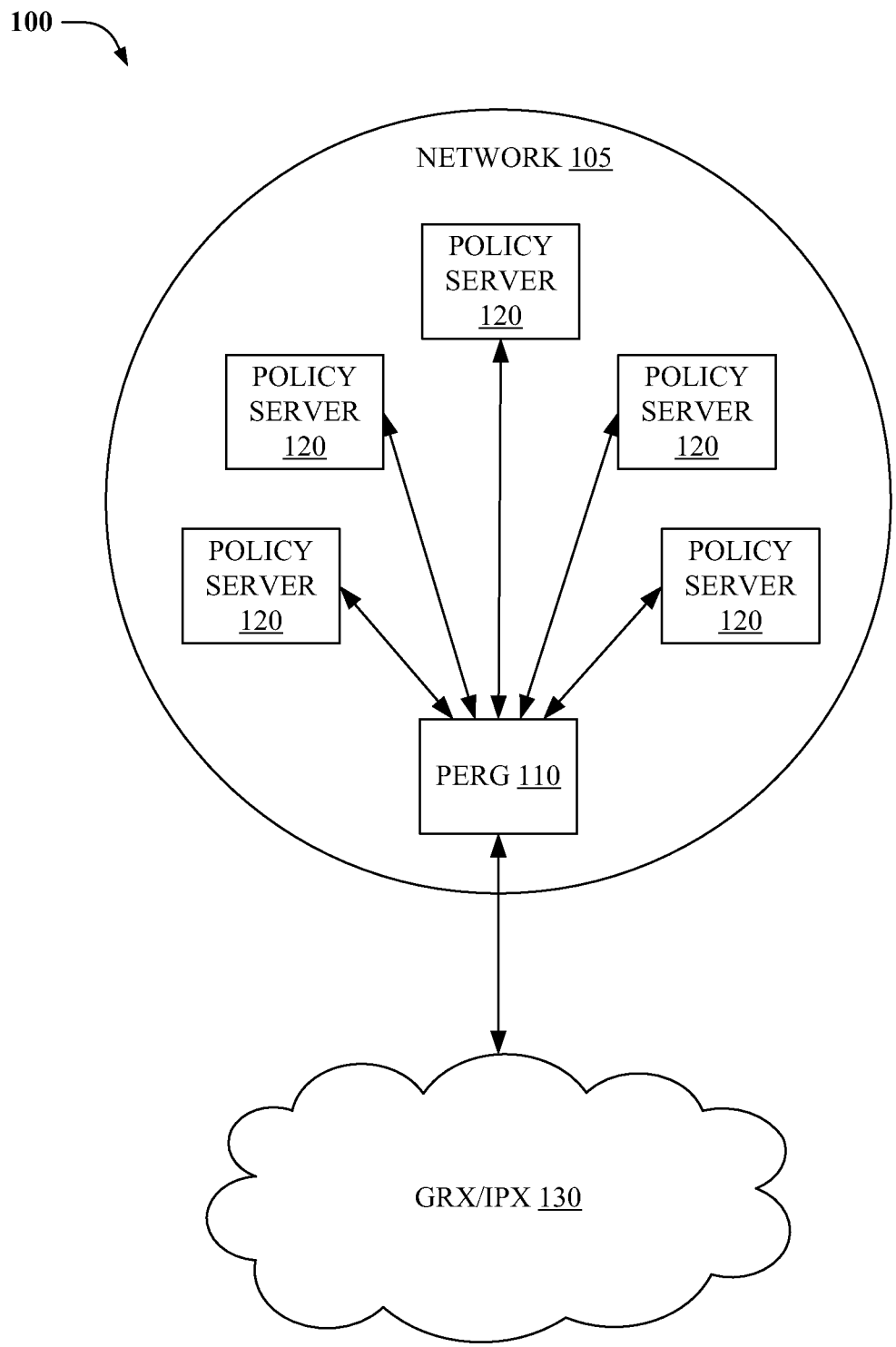
FIG. 1 illustrates a block diagram of a roaming environment, in accordance with an embodiment.

Various non-limiting embodiments of systems, methods, and apparatus presented herein centrally manage service related information within a roaming environment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via analysis component 230, to automatically map one or more parameters related to a quality of a communication service to one or more service policies as a function of one or more roaming agreements. In another example, the artificial intelligence system can be used, via distribution component 240, to automatically distribute the one or more service policies to one or more policy servers of a network.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Referring now to FIG. 1, a block diagram of a roaming environment 100 is illustrated, in accordance with an embodiment. Aspects of roaming environment 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Roaming environment 100 includes network 105 that can be associated with a service provider (or operator). The operator can include a Mobile Network Operator (MNO), a Fixed Network Operator (FNO), an Internet Service Provider (ISP), and/or an Application Service Provider (ASP).

Further, network 105 can connect to other networks (not shown) via an interface over General Packet Radio Service (GPRS) Roaming Exchange (GRX)/Internetwork Packet Exchange (IPX) interface GRX/IPX 130. As such, in an aspect, network 105 can couple to the other networks via a Diameter protocol based interface similar to S9 as defined by 3GPP specifications, which provides transfer of QoS policy and charging rules between networks of different service providers. In another aspect, such roaming interface can provide transfer of QoS policy and charging rules utilizing Lightweight Directory Access Protocol (LDAP).

As described above, although conventional roaming techniques have specified quality of service (QoS) requirement(s) for Internet Protocol (IP) based services, such techniques do not enable centralized management of QoS parameter(s) associated with services offered while the user is roaming between the user's home network and a network of a roaming partner associated with the user's home network.

On the other hand, a policy enabled roaming gateway (PERG) 110 included in a network, e.g., network 105, can improve user experience(s) by centrally managing roaming related information. PERG 110 can be deployed at an edge, or behind a diameter proxy, of network 105, and can centrally manage service level agreements (SLAs)—including associated QoS requirement(s) of services provided via roaming partners of the operator of network 105. PERG 110 can connect to policy servers 120; and each policy server 120 can represent a Policy and Charging Rules Function (PCRF),e.g., similar to one defined by 3GPP specifications, which can authorize communication(s), e.g., IP sessions meeting specific QoS requirement(s).

In an aspect, once the operator of network 105 and its roaming partner agree to an SLA, and the SLA is provisioned, PERG 110 can map QoS requirement(s) of a communication service requested by an inbound roamer or an outbound roamer to one of the uniform network service policies representing QoS capabilities of an associated visited operator network, based on the network service parameters associated/specified by the SLA.

Further, PERG 110 can (1) distribute the one or more uniform network policies to policy servers 120, e.g., for providing the communication service to the inbound roamer; or (2) transfer, forward, etc. information related to the uniform network policies from network 105 to a network (not shown) associated with the roaming partner, e.g., for providing the communication service to the outbound roamer.

As such, unlike conventional roaming technologies, PERG 110 can improve user experience(s) since (1) policy servers 120, e.g., acting as 3GPP defined PCRFs, are not each required to track roaming agreements and/or map QoS requirements to QoS capabilities of service requests associated with different roaming partners of the operator of network 105; and/or (2) information about communication service requests of an outbound roamer can be mapped to appropriate roaming agreements by the outbound roamer's home network based on one or more policies of the home network.

In one aspect, the QoS requirement(s) can include maximum tolerance(s) of jitter, packet loss, delay, or availability of a communication service requested by the inbound roamer or the outbound roamer. Availability of the communication service can be provided if the inbound roamer or the outbound roamer is allowed a particular service based on operator policies or regulatory requirements. Jitter can include a delay variation among different packets sent from a source to a destination measured over a period of time. Packet loss can include a ratio, or percentage, of dropped, or lost, packets to all packets sent from the source to the destination—measured over a period of time. Delay can include a time that it takes to transmit an IP packet from the source to the destination and receive, at the source, a reply packet from the destination.

In another aspect, the one or more uniform network service policies can be associated with one or more QoS capabilities of the associated visited network. As an example not meant to limit various non-limiting embodiments described herein, if a customer, e.g., inbound roamer, of the roaming partner roams into the network of the service provider and requests a service, e.g., a VoIP service associated with a QoS requirement to endure a 100 packet loss per 1 million packets at a jitter of 5 milliseconds, then analysis component 230 can select from QoS capabilities of the network to create a uniform network service profile—the QoS capabilities selected via analysis component 230, e.g., which maintains an associated customer's VoIP service experience, by closely matching the service's QoS requirements.

In an aspect, the QoS capabilities can be selected based on information included in and/or associated with the roaming agreement (or SLA). For example, as described below, PERG 110, e.g., via decision component 210 (see below), can reject servicing a service request if (1) the service request is not related to an existing SLA, or (2) information of the SLA does not exist and a dynamic roaming agreement and/or a dynamic negotiation between two network operators is not supported/was not successful. As described below, dynamic negotiation component 250 (see below) can enable the two network operators to dynamically negotiate parameters of an SLA.

In another example, in response to the requested VoIP service described above, and based on the SLA, analysis component 230 can select a service policy (of the one or more uniform network service policies) to provide the VoIP service (based on a QoS capability) that endures a lower (50) packet loss per 1 million packets at a higher jitter of 10 milliseconds, e.g., striving to provide satisfactory VoIP service to the customer based on QoS capabilities of the network being used that differ from QoS requirements associated with the requested VoIP service.

Figure 2:
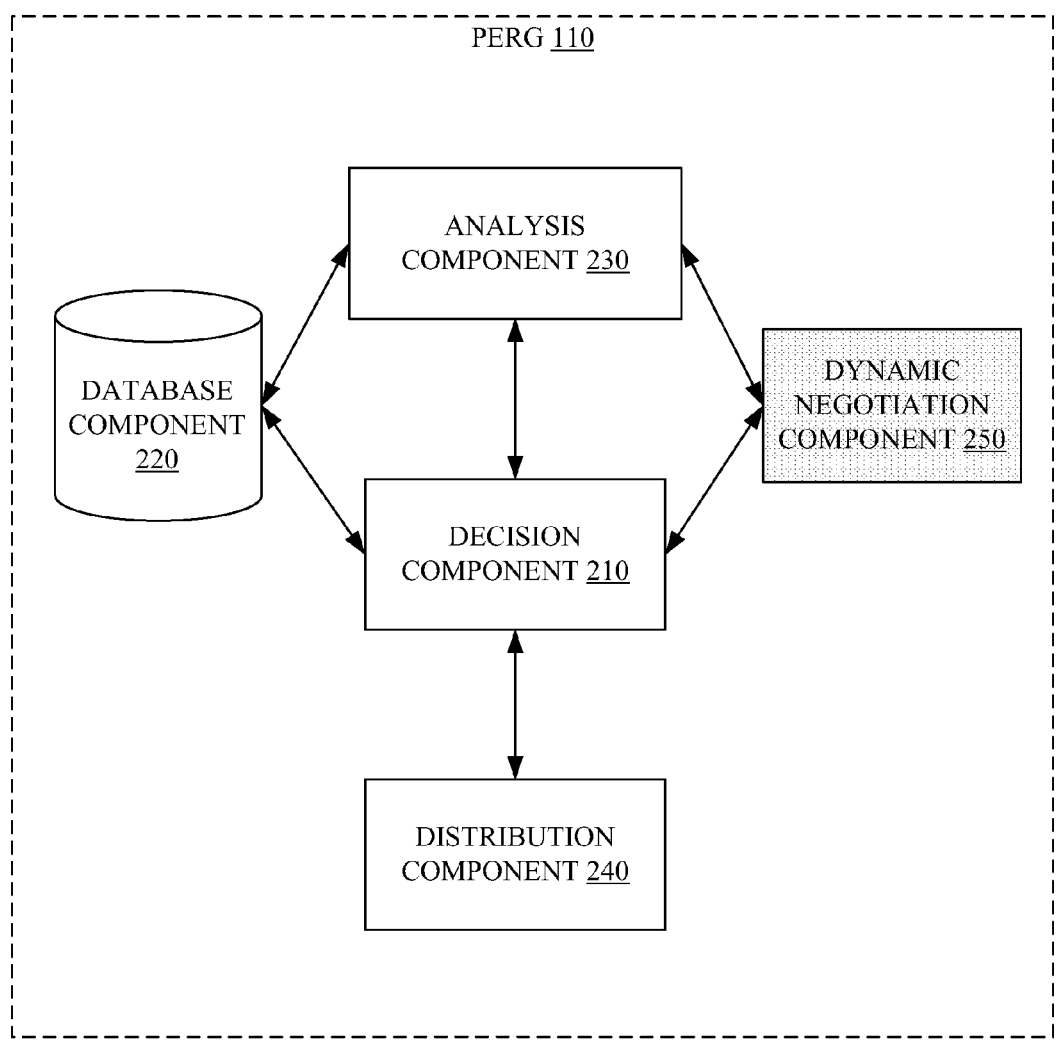
FIG. 2 illustrates a block diagram of a policy enabled roaming gateway (PERG), in accordance with an embodiment.

Now referring to FIG. 2, PERG 110 is illustrated, in accordance with an embodiment. PERG 110 can include a decision component 210, a database component 220, an analysis component 230, and a distribution component 240. In an aspect, database component 220 can be configured to store and/or retrieve, e.g., via computer servers coupled to network 105, a roaming agreement (or SLA) and/or information associated with the SLA. In one aspect, the SLA can include a written contract between the two network operators that defines a performance requirement for service(s) provided to customer(s) of the roaming partner.

In yet another aspect, decision component 210 can be configured to determine whether a communication service requested by an inbound/outbound roamer is associated with an existing SLA. If the communication service requested by the inbound/outbound roamer is associated with an existing SLA, analysis component 230 can be configured to map (or translate) one or more parameters related to a quality (or QoS requirement) of a communication service requested by an inbound/outbound roamer to a uniform network service policy—based on network service parameter(s)/information specified by the existing SLA. For example, the one or more parameters can include at least one QoS requirement associated with a request to provide the communication service from the network associated with the roaming partner, e.g., to an inbound roamer (see, e.g., FIG. 3), or to an outbound roamer (see, e.g., FIG. 4).

In yet another aspect illustrated by FIG. 2, PERG 110 can optionally include dynamic negotiation component 250. In an aspect, dynamic negotiation component 250 can be configured to enable dynamic negotiation of one or more SLA parameters of a communication service requested by the inbound/outbound roamer if no information associated with the SLA exists, and associated network operators are willing to dynamically negotiate the one or more SLA parameters. In another aspect, PERG 110 can reject the communication service requested by the inbound/outbound roamer if SLA parameters were not successfully negotiated, e.g., there is no agreement to adjust, modify, change, etc. an original QoS requirement of the communication service requested by the inbound/outbound roamer. In yet another aspect, decision component 210 can be configured to reject servicing of the communication service requested by the inbound/outbound roamer if information of the SLA does not exist and a dynamic roaming agreement is not supported, and/or dynamic negotiation between network operators was not successful.

In one aspect, database component 220 can be configured to store state information, e.g., associated with a dynamically negotiated service, in the database(s), storage medium(s), etc. For example, if SLA parameters were dynamically negotiated, e.g., a bandwidth related to an original QoS requirement of an associated service was dynamically negotiated to be lower, then state information associated with the dynamic negotiation, e.g., indicating services were provided via the network at a bandwidth below QoS requirement(s), can be stored in the database(s), storage medium(s), etc. via database component 220. As such, in an aspect, the stored state information can be utilized to affect at least one of charging information associated with the communication service or a settlement associated with the communication service, e.g., reducing fees associated with the lower bandwidth communication service.

It should be appreciated that one or more aspects described above relating to dynamic negotiation component 250 can apply in an outbound roaming scenario. For example, dynamic negotiation component 250 can be configured to enable the service provider to dynamically negotiate an SLA/parameter(s) of the SLA with the partner, so that the communication request can be provided to the outbound roamer in a network associated with the partner—based on the dynamically negotiated SLA/parameter(s).

In an aspect, database component 220 can be further configured to store the parameter(s), the quality (or QoS requirement) of the communication service, or a service policy of the one or more uniform network service policies in the database(s), storage medium(s), etc. In another aspect, database component 220 can be further configured to store state information related to the communication service requested from the network. For example, in an aspect described below, the state information can be associated with charging information related to the communication service.

In one aspect, distribution component 240 can be configured to distribute the one or more uniform service policies to policy server(s), e.g., 120, of the visited network, e.g., network 105, for example, to provide the communication service to the inbound roamer. As such, the one or more policy servers can authorize communication(s), e.g., the communication service, IP transfers via network 105, etc. based on the one or more uniform service policies derived by analysis component 230.

In another aspect, distribution component 240 can be configured to transfer, forward, etc. information of the one or more uniform service policies from network 105 to a network (not shown) associated with partner(s), or roaming partner(s), e.g., for providing the communication service to the outbound roamer. For example, distribution component 240 can be configured to transfer the information to a PERG of an other network or an individual policy server of the other network for providing the communication service to the outbound roamer.

Figure 3:
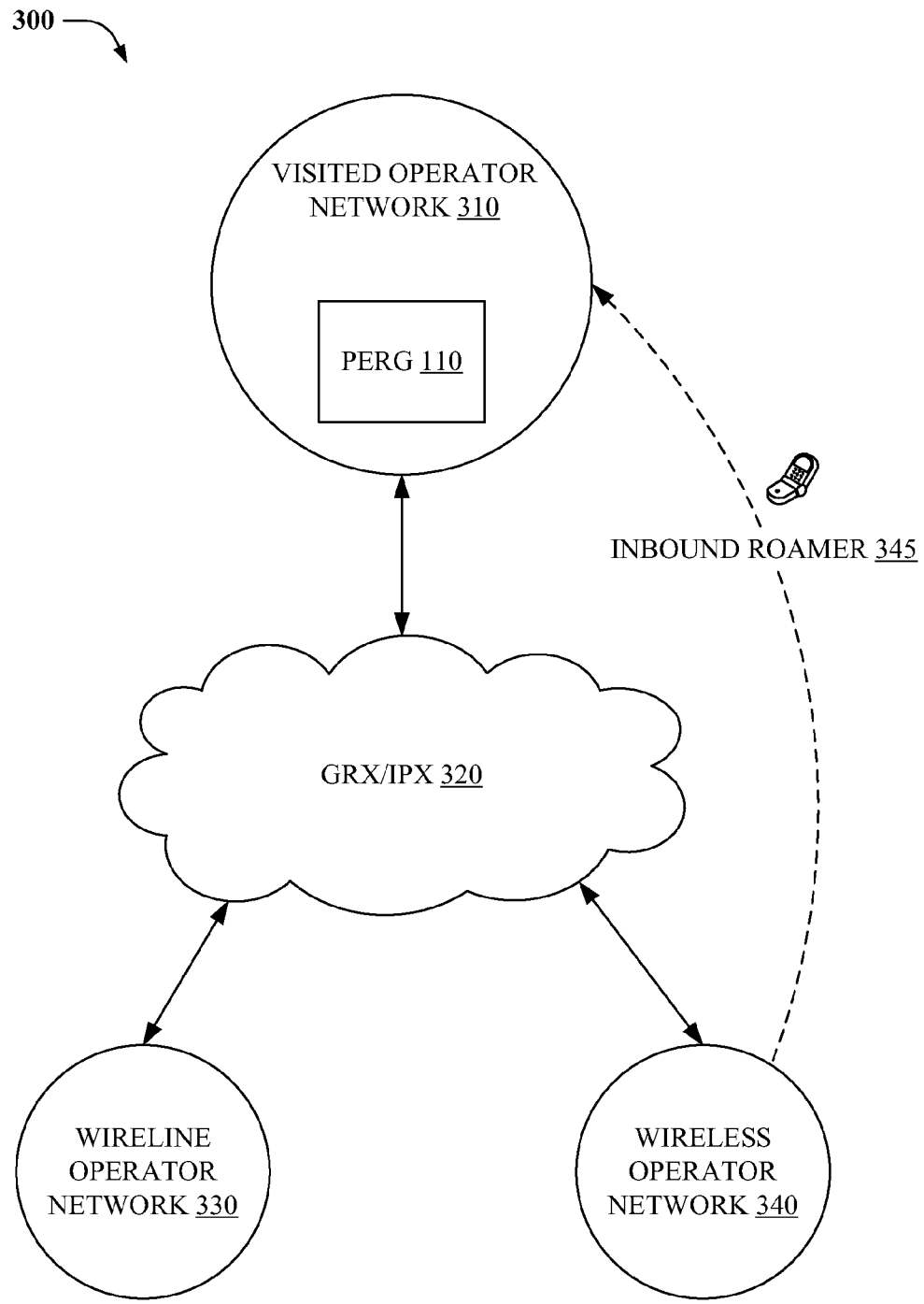
FIG. 3 illustrates a block diagram of an inbound roaming environment, in accordance with an embodiment.

FIG. 3 illustrates a block diagram of an inbound roaming environment 300, in accordance with an embodiment. Inbound roaming environment 300 can include GRX/IPX 320 that connects visited operator network 310, e.g., a wireless network, with wireline operator network 330 and wireless operator network 340. As such, PERG 110 can centrally manage tracking of SLAs and/or mapping of QoS requirements associated with SLAs between operators of wireless and/or fixed/mobile-converged communication networks, e.g., between an operator of a wireless network and an operator of a wireline network.

PERG 110 can store, e.g., via database component 220, roaming agreement(s) between an operator network 310 and its roaming partner(s) (e.g., wireline operator network 330 and wireless operator network 340). Further, PERG 110 can map, e.g., via analysis component 230, QoS requirement(s) of communication service(s) requested by inbound roamer 345 (e.g., a customer associated with wireline operator network 330 and/or wireless operator network 340) to one or more service policies representing QoS capabilities of operator network 310, e.g., selected to closely match the QoS requirement(s), to meet customer service expectations, and/or to meet SLA defined requirement(s)/parameter(s).

Furthermore, distribution component 240 can distribute/transfer the one or more policies representing the QoS capabilities of operator network 310 to policy server(s) (not shown) of operator network 310. As such, the policy server(s) can subsequently authorize communication(s) offered by operator network 310 to/from inbound roamer 345 based on these policies.

Figure 4:
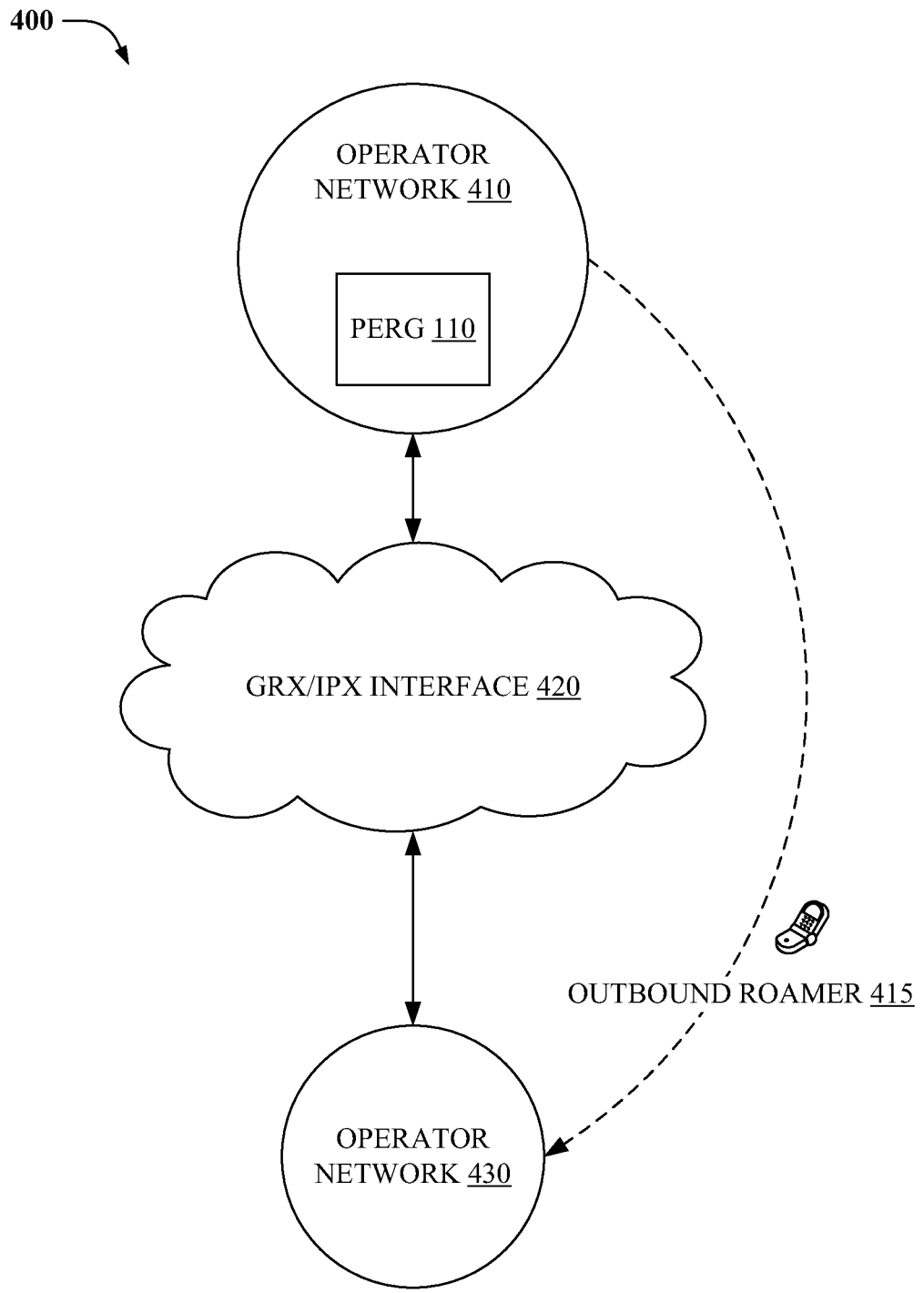
FIG. 4 illustrates a block diagram of an outbound roaming environment, in accordance with an embodiment.
Figure 5:
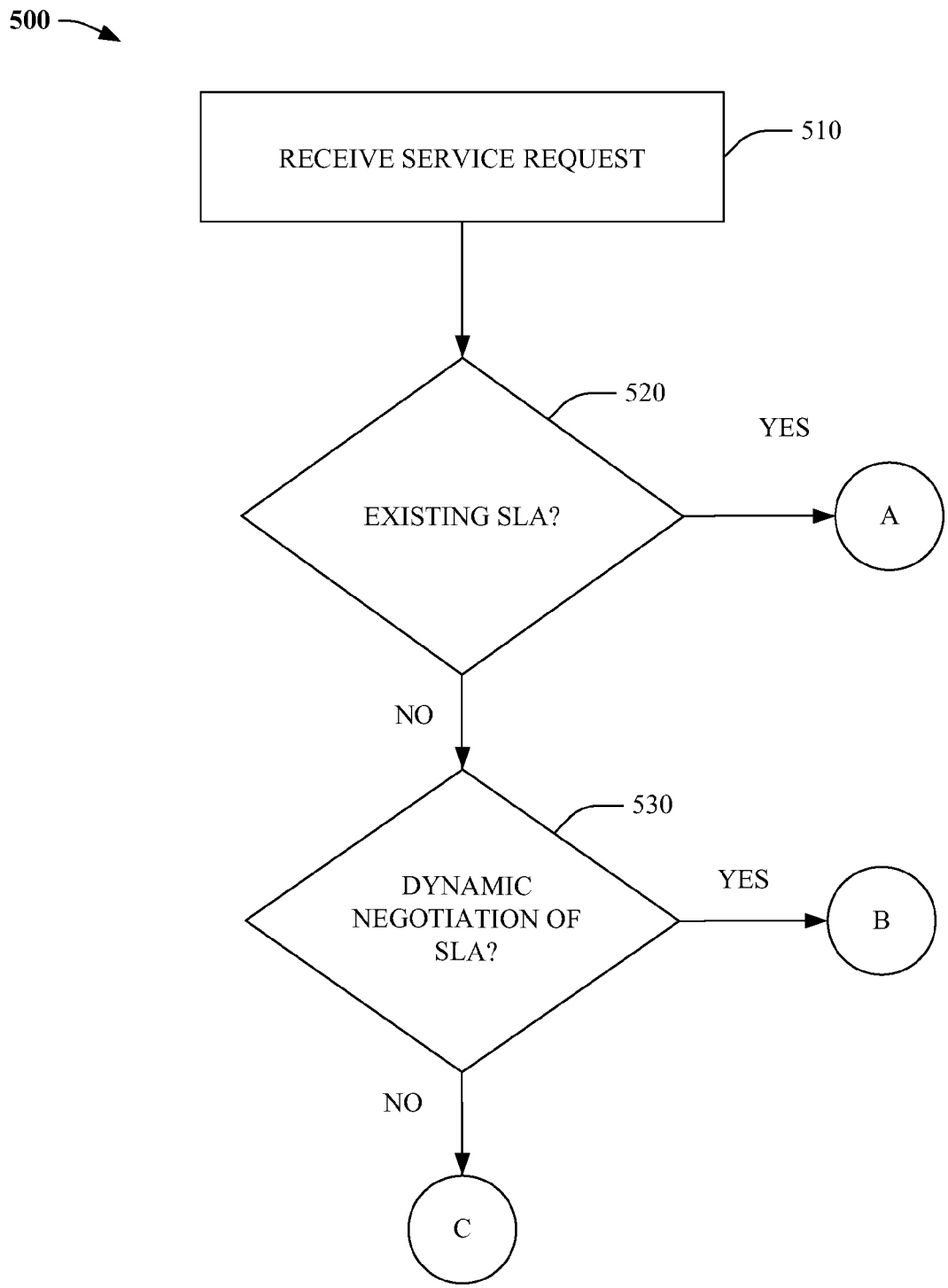
FIGS. 5-9 illustrate various processes associated with one or more policy enabled roaming gateways (PERGs), in accordance with an embodiment.
Figure 6:
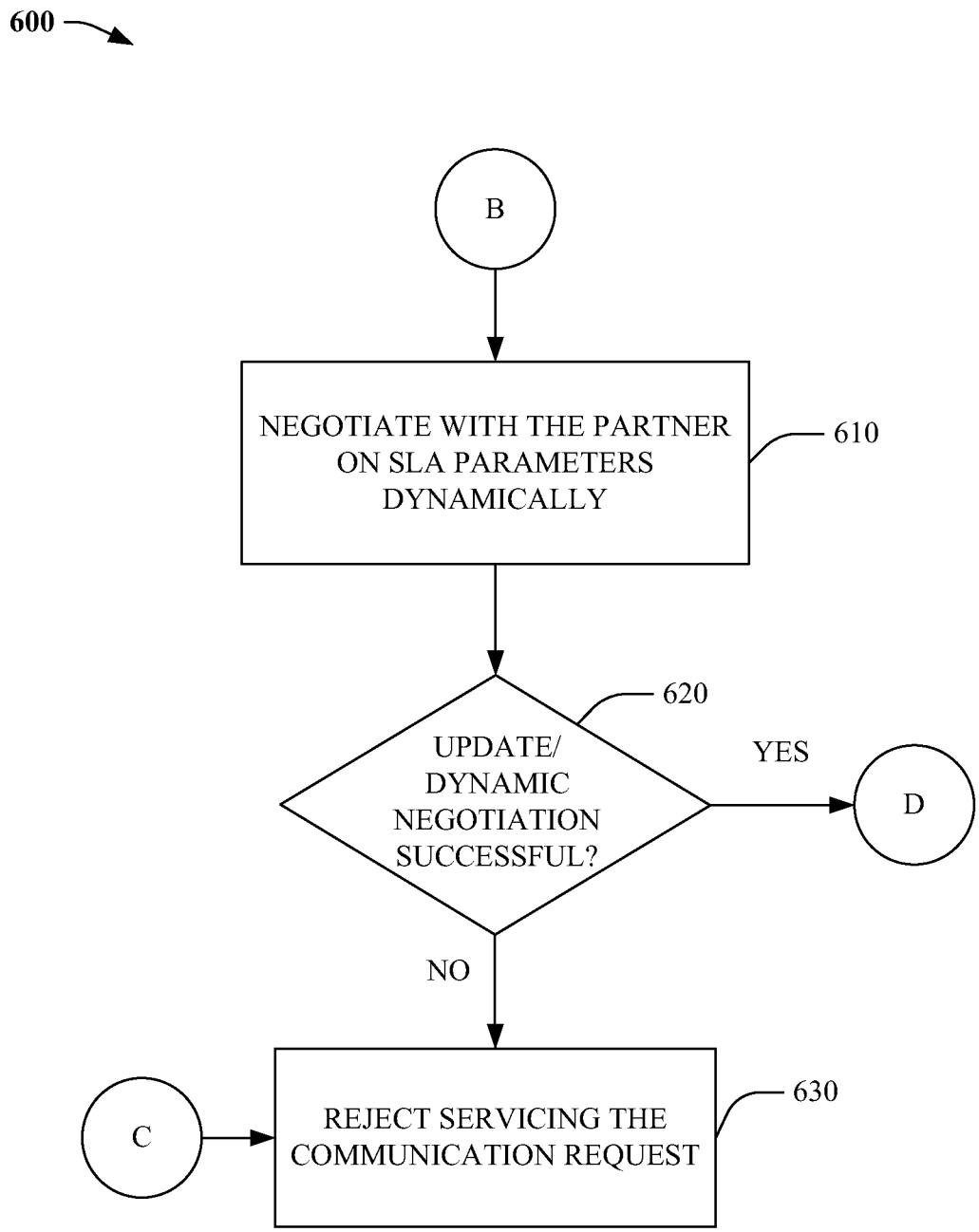
Figure 7:
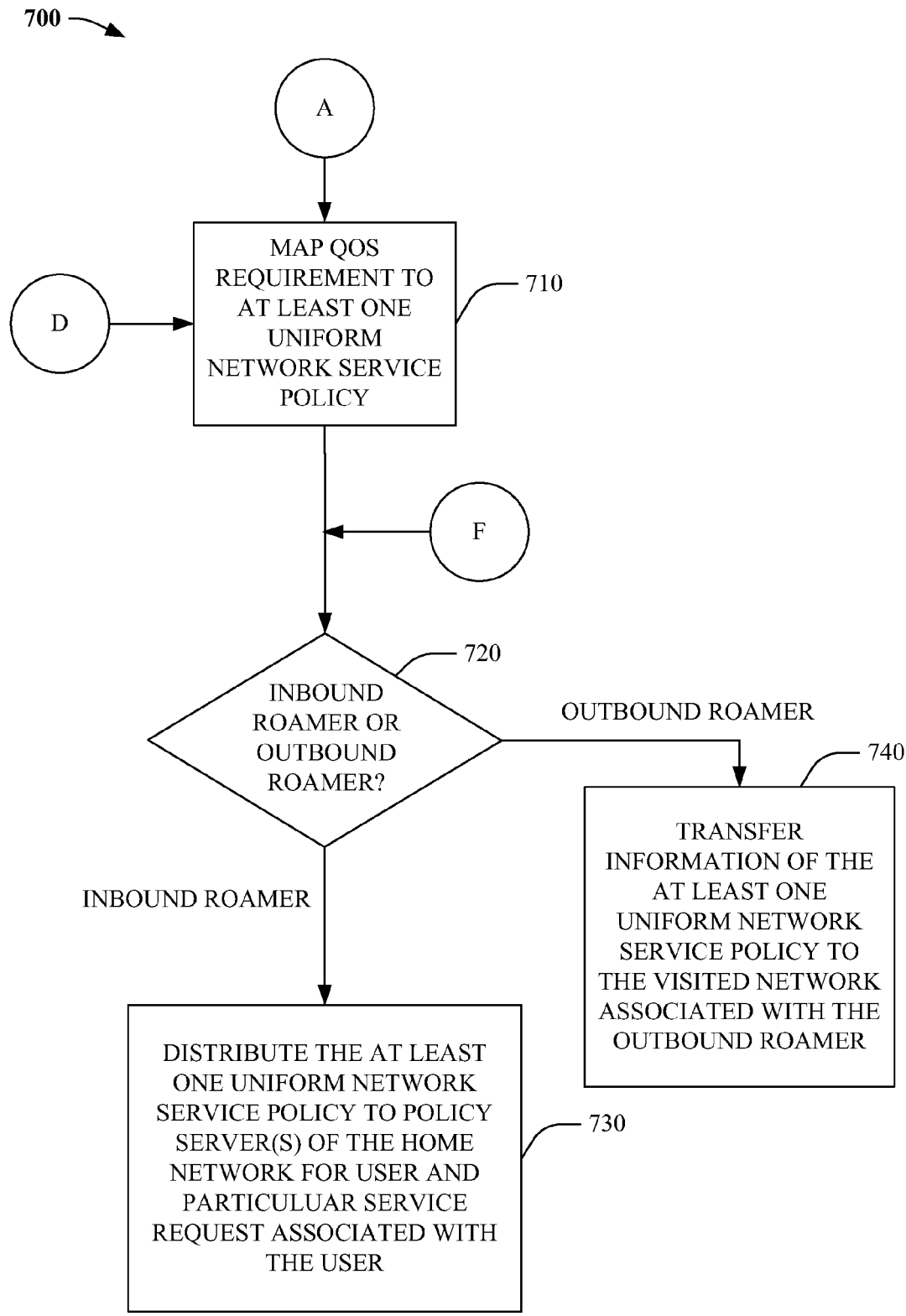

FIG. 4 illustrates a block diagram of an outbound roaming environment 400 providing outbound roaming support to an outbound roamer via a roaming partner's network, in accordance with an embodiment. Outbound roaming environment 400 includes PERG 110, which can be configured to provide after analysis, one or more parameters associated with QoS requirements for communication services to be used by the outbound roamer—the QoS requirements to be delivered on the roaming partner's network.

Further, analysis component 230 can be configured to map and/or translate the one or more parameters associated with the quality of the communication service request into one or more uniform network service policies, e.g., based on a roaming agreement, or information associated with the roaming agreement, e.g., stored via database component 220. Furthermore, PERG 110 can be configured to transfer, forward, etc. information of the one or more uniform network service policies from operator network 410 to operator network 430, so that the communication service can be provided to the outbound roamer based on the one or more uniform network service policies.

As part of the mapping/translation functions described above, the analysis component 230 can be configured to compare one or more qualities, e.g., QoS requirement(s), of communication services specified by, or common to, roaming agreements between an operator of a home network and its roaming partner(s). Further, analysis component 230 can further be configured to select at least one QoS requirement of QoS requirement(s) that differs between the roaming agreements by less than and/or equal to a predetermined threshold.

Accordingly, PERG 110 can harmonize and/or associate roaming policies of different roaming partners—standardizing disparate service policies of different roaming partners into common network policies—by mapping the selected QoS requirement(s) into the at least one uniform network service policy.

FIGS. 5-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 5-9, processes (500-900) associated with PERG 110 servicing inbound/outbound roamers are illustrated, in accordance with an embodiment. At 510, a service request associated with a user, or an inbound/outbound roamer, can be received. At 520, PERG 110 can determine whether the service request is associated with an existing SLA. If PERG 110 determines the service request is associated with an existing SLA, then process 500 can continue to 710, at which analysis component 230 can map the QoS requirement to at a uniform service policy; otherwise, flow can continue to 530, at which PERG 110 can determine, e.g., via decision component 210, whether a roaming agreement, or an SLA, can be dynamically established. If the roaming agreement (or the SLA) can be dynamically established, then process 500 can continue to 610, at which dynamic negotiation component 250 can enable the operator to dynamically negotiate SLA parameter(s) with the partner utilizing a dynamic roaming agreement; otherwise, PERG 110 can reject servicing the communication request at 630.

Referring now to process 600, PERG 110 can determine at 620, e.g., via analysis component 230, whether the update/dynamic negotiation was successful, e.g., the QoS requirement can be met via QoS capabilities of the visited network. If PERG 110 determines the update/dynamic negotiation was successful, then flow can continue to 710 at which analysis component 230 can map the QoS requirement to at least one uniform service policy of the associated network; otherwise, flow can continue to 630, at which PERG 110 can reject servicing the communication request. Now referring to FIG. 7, flow can continue from 710 to 720, at which PERG 110, e.g., via analysis component 230, can determine whether the communication request is associated with an inbound roamer or an outbound roamer.

If PERG 110 determines that the request is associated with an inbound roamer, then PERG 110, e.g., via distribution component 240, can distribute (at 730) a uniform service policy of the network to policy server(s) of its network for an inbound roamer. On the other hand, if PERG 110 determines, e.g., via analysis component 230, that the communication request is associated with an outbound roamer, then flow can continue to 740, at which a uniform service policy can be transferred to the visited network associated with its outbound roamer. For example, the information can be transferred, via PERG 110, to a PERG of the visited network or an individual policy server of the visited network. As such, the request can be serviced via the visited network based on the information.

Figure 8:
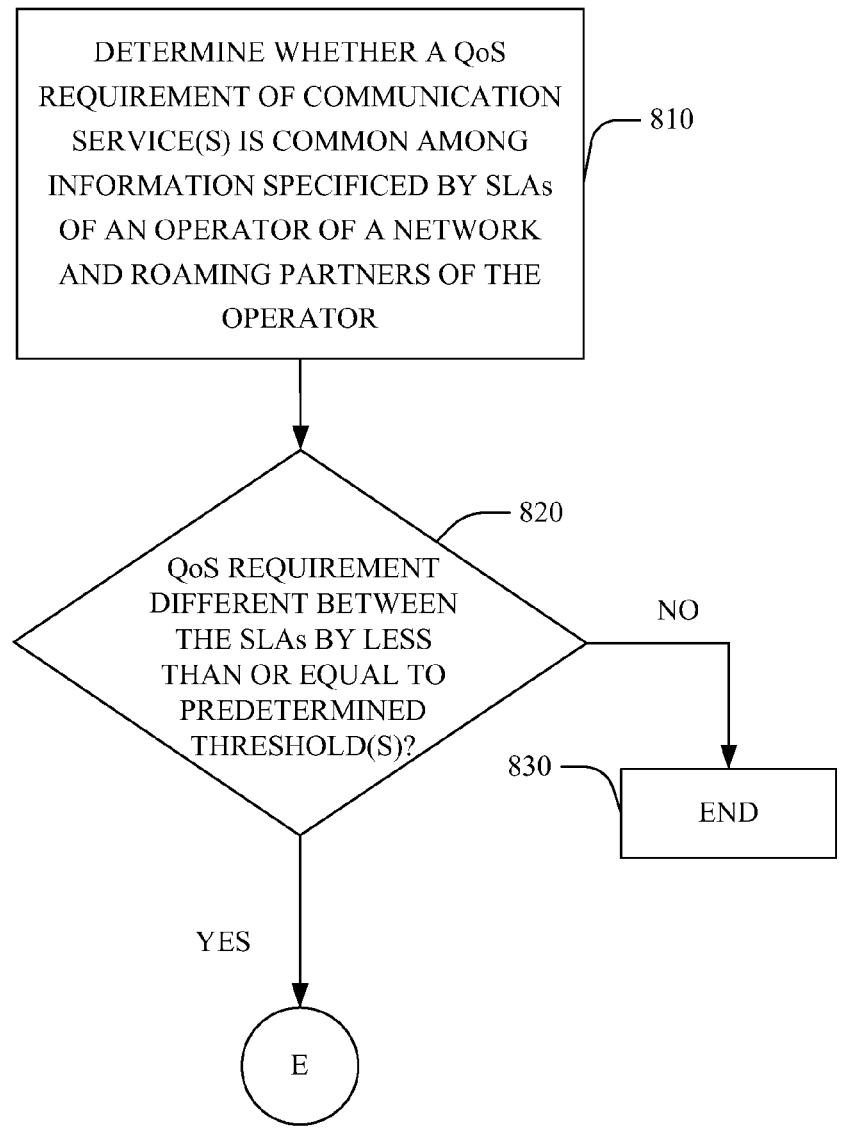
Figure 9:
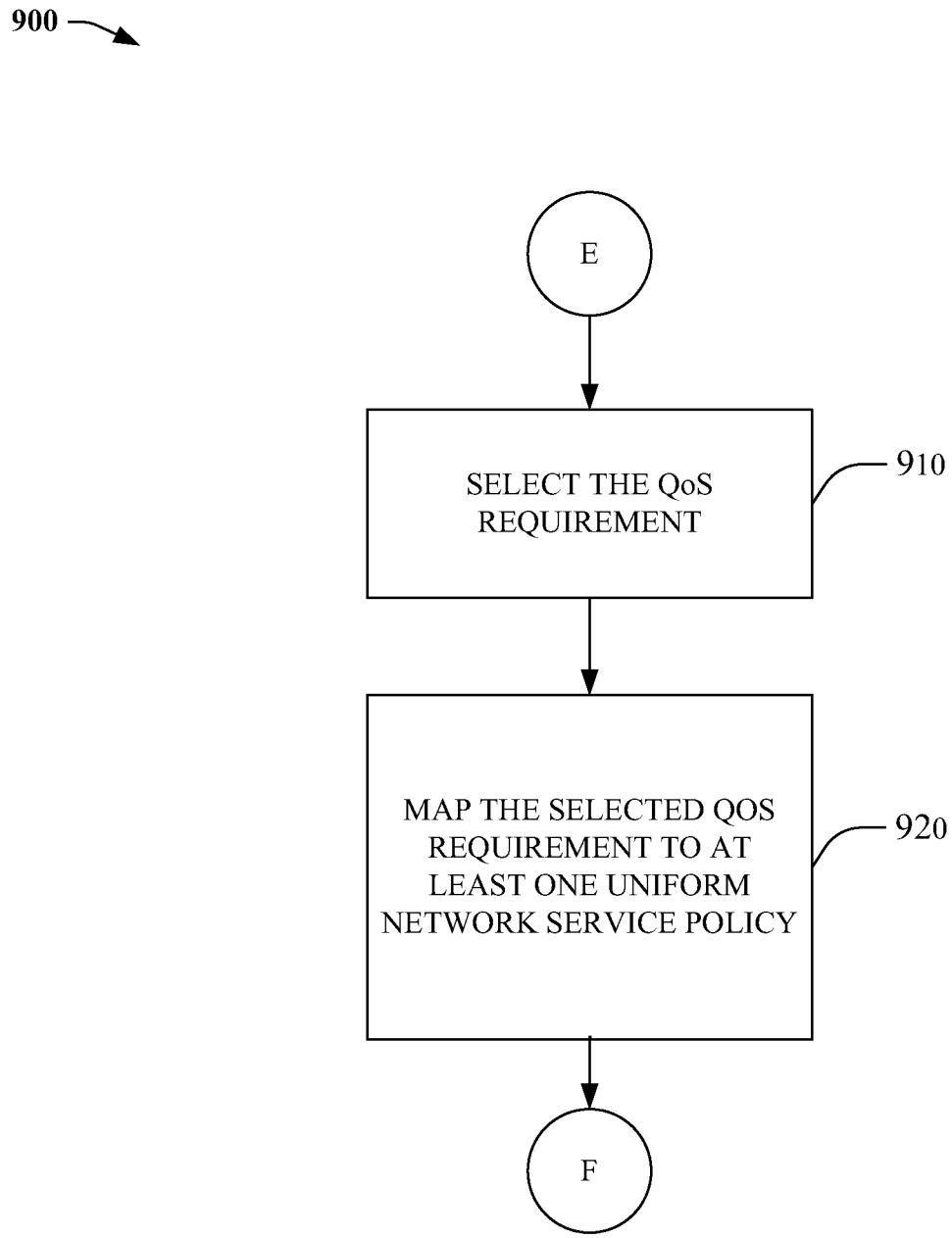

FIGS. 8-9 illustrate process 800 and 900 associated with harmonizing a QoS requirement common to roaming agreements (or SLAs) between an operator of a network and its roaming partner(s). At 810, PERG 110, e.g., via analysis component 230, can determine whether a QoS requirement of communication service(s) is common among information specified by SLAs between an operator of a network and its roaming partner(s). At 820, PERG 110, e.g., via analysis component 230, can determine whether the QoS requirement differs between the SLAs within, by less than or equal to, predetermined threshold(s). If PERG 110 determines that the QoS requirement differs between the SLA greater than, or outside of, the predetermined threshold(s), then process 800 can end at 830; otherwise, flow can continue to 910, at which PERG 110, e.g., via analysis component 230, can select the QoS requirement. Further, at 920, PERG 110, e.g., via analysis component 230, can map the selected QoS requirement to a uniform service policy. Subsequently, flow can continue to 720 (see above).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above (e.g., associated with database component 220), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
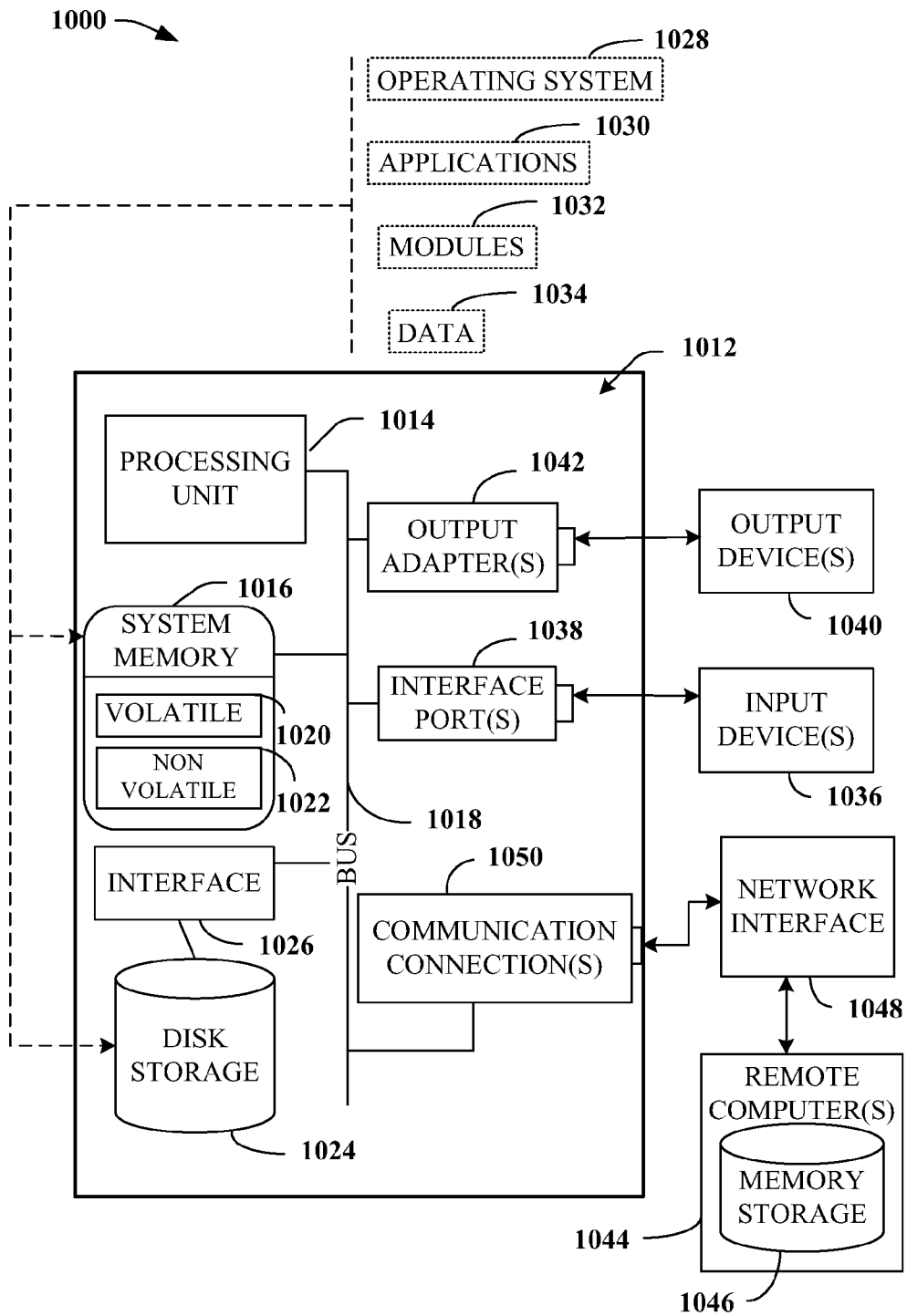
FIG. 10 illustrates a block diagram of a computing system operable to execute the disclosed systems and methods, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented, e.g., various processes associated with FIGS. 1-9. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media, networked attached storage (NAS), e.g., SAN storage, etc. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1014 through system bus 1018 via interface port(s) 1038. Interface port(s) 1038 include, for example, a serial port, a parallel port, a game port, and a universal serial bus (USB). Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
configuring, by a system comprising a processor, a policy enabled roaming gateway device operable within a diameter proxy based interface of a first service provider network;
in response to determining that a roaming agreement does not exist between the first service provider network and a second service provider network associated with a network device coupled to a wireless device, initiating, by the system via the policy enabled roaming gateway device, a negotiation of a quality of service parameter for a request for a communication service received from the wireless device;
mapping, by the system via the policy enabled roaming gateway device, the quality of service parameter to a network service policy associated with the first service provider network and the second service provider network; and
facilitating, by the system, the communication service according to the network service policy.

2. The method of claim 1, further comprising:
distributing, by the system via the policy enabled roaming gateway device, the network service policy to a policy server device in the network,
wherein the request is associated with an inbound roaming device.

3. The method of claim 1, further comprising:
transferring, by the system via the policy enabled roaming gateway device, information of the network service policy to a policy server device of another network,
wherein the request is associated with an outbound roaming device.

4. The method of claim 1, further comprising:
determining, by the system via the policy enabled roaming gateway device, whether the roaming agreement exists between the first service provider network and the second service provider network, wherein the wireless device is an outbound roaming device.

5. The method of claim 1, further comprising:
determining, by the system via the policy enabled roaming gateway device, whether the roaming agreement exists between the first service provider network and the second service provider network, wherein the wireless device is an inbound roaming device.

6. The method of claim 1, further comprising:
in response to the initiating the negotiation, establishing, by the system via the policy enabled roaming gateway device, the roaming agreement between the first service provider network and the second service provider network, wherein the wireless device is an outbound roaming device.

7. The method of claim 1, further comprising:
in response to the initiating the negotiation, establishing, by the system via the policy enabled roaming gateway device, the roaming agreement between the first service provider network and the second service provider network, wherein the wireless device is an inbound roaming device.

8. The method of claim 1, wherein the initiating the negotiation comprises initiating the negotiation of the quality of service parameter utilizing a dynamic roaming agreement different from the roaming agreement.

9. The method of claim 1, further comprising:
in response to determining that the roaming agreement does not exist and in response to determining that a dynamically formed roaming agreement does not exist between the first service provider network and the second service provider network, rejecting, by the system via the policy enabled roaming gateway device, the request.

10. A system, comprising:
a memory to store executable instructions; and
a processor, coupled to the memory, that facilitates execution of the executable instructions to perform operations, comprising:
creating a policy enabled roaming gateway service associated with a first network device configured to operate within a diameter proxy based interface of a first service provider network;
in response to determining that a roaming agreement does not exist between the first service provider network and a second service provider network associated with a second network device coupled to a wireless device, initiating, via the policy enabled roaming gateway service, a negotiation of quality of service information for a request for a communication service received from the wireless device;
mapping, via the policy enabled roaming gateway service, the quality of service information to a network service policy associated with the first service provider network and the second service provider network; and initiating the communication service based on the network service policy.

11. The system of claim 10, wherein the operations further comprise:

in response to the initiating the negotiation, rejecting, via the policy enabled roaming gateway service, the request for the communication service.

12. The system of claim 11, wherein the initiating the negotiation further comprises:

initiating a parameter negotiation of a parameter value of the communication service.

13. A computer-readable storage device comprising executable instructions that, in response to execution, cause a computing device comprising a processor to perform operations, comprising:

initiating a configuration of a policy enabled roaming gateway service, wherein the computing device is configured to operate within a diameter proxy based interface of a first service provider network;

in response to determining that a roaming agreement does not exist between the first service provider network and a second service provider network associated with a network device coupled to a wireless device, initiating, via the policy enabled roaming gateway service, a negotiation of a quality of service parameter for a request for a communication service received from the wireless device;

mapping, via the policy enabled roaming gateway service, the quality of service parameter to a service policy associated with the first service provider network and the second service provider network; and enabling the communication service based on the service policy.

14. The computer-readable storage medium of claim 13, wherein the operations further comprise:

distributing, via the policy enabled roaming gateway service, the service policy to a policy server device of the first service provider network.

15. The computer-readable storage medium of claim 13, wherein the operations further comprise:

transferring, via the policy enabled roaming gateway service, service based information associated with the first service provider network and the second service provider network to another network device.

16. The computer-readable storage medium of claim 13, wherein the operations further comprise:

in response to the initiating the negotiation, rejecting, via the policy enabled roaming gateway service, the request.

* * * * *